Figure 1:
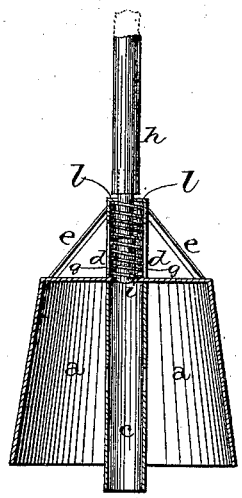
Figure 2:
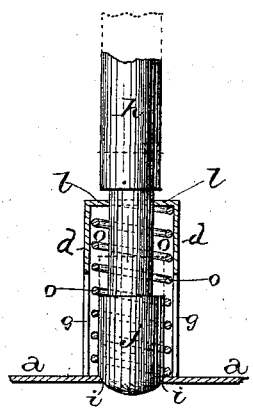

E. R. SWAN.
CLOTHES-POUNDER.

No. 178,202.

Patented May 30, 1876.

WITNESSES.
J. Wm. Garner
G. Walter Gibbons

INVENTOR.
E. R. Swan
Per
F. A. Lehmann, Atty

UNITED STATES PATENT OFFICE.

EUGENE R. SWAN, OF APLINGTON, IOWA.

IMPROVEMENT IN CLOTHES-POUNDERS.

Specification forming part of Letters Patent No. 178,202, dated May 30, 1876; application filed May 5, 1876.

*To all whom it may concern:*

Be it known that I, EUGENE R. SWAN, of Aplington, in the county of Butler and State of Iowa, have invented certain new and useful Improvements in Atmospheric Washer; and I do hereby declare the following to be a full, clear, and exact description of the invention, such as will enable others skilled in the art to which it pertains to make and use it, reference being had to the accompanying drawings, which form part of this specification.

My invention relates to an improvement in atmospheric pounders for washing clothes; and it consists in making a vent in the top of the cup which is to be opened and closed by a valve formed on the end of the handle, as the washer is raised up and forced downward, as will be more fully described hereinafter, whereby the cup is made to take in air on each upstroke, and to force it down through the clothes on each downstroke.

The accompanying drawings represent my invention.

$a$ represents the cup, which is made of any desired size or shape, and which has the tube $c$ projecting downward through its center, which tube has a hole or slot cut in its side so as to let the air pass through it into the cup. To the top of the cup is secured another tube, $d$, suitably braced by the stays $e$, and which has slots $g$ cut in two of its sides so as to freely admit the air which is to pass down through the hole $i$ in the top of the cup. Into this tube $d$ is passed the lower end of the handle $h$, to which is secured a piece of rubber, $j$, which rubber forms a valve for tightly closing the hole $i$. Around this rubber and the end of the handle is wrapped a coiled spring, $o$, the upper end of which spring catches under the inwardly-turned flange $l$, and thus prevents the handle from being withdrawn.

When it is attempted to draw the pounder up out of the water and clothes, the coiled spring is compressed enough to allow the hole $i$ to be uncovered, when air at once passes in and fills the cup, but as soon as the pounder is forced downward, the rubber on the end of the handle at once closes the hole so that the air cannot escape, and it is then forced out through the clothes.

Having thus described my invention, I claim—

1. In an atmospheric pounder, a cup, $a$, having an opening in its top, which is opened and closed by the valve $j$ on the end of the handle, substantially as shown.

2. The combination of a cup, $a$, tube $d$, and handle $h$, the lower end of which opens and closes the hole $i$, with the spring $o$ and flange or stop $l$, substantially as shown.

In testimony that I claim the foregoing I have hereunto set my hand this 29th day of April, 1876.

EUGENE R. SWAN.

Witnesses:
R. T. JACKSON,
J. W. LAMB.